(12) United States Patent
Friedman et al.

(10) Patent No.: US 6,240,513 B1
(45) Date of Patent: *May 29, 2001

(54) NETWORK SECURITY DEVICE (75) Inventors: Aharon Friedman, Clearwater; Eva Bozoki, Tampa, both of FL (US)

(73) Assignee: Fortress Technologies, Inc., Tampa, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,698

(22) Filed: Dec. 31, 1997

Related U.S. Application Data (60) Provisional application No. 60/033,995, filed on Jan. 3, 1997.

(51) Int. Cl.[7] .................................................. G04L 9/00
(52) U.S. Cl. ......................... 713/152; 713/160; 713/161
(58) Field of Search ..................... 380/37, 42; 713/152, 713/153, 160, 161, 162

(56) References Cited

U.S. PATENT DOCUMENTS

| | | |
|---|---|---|
| 3,816,666 | 6/1974 | Tomozawa et al. . |
| 4,122,213 | 10/1978 | Ito et al. . |
| 4,159,468 | 6/1979 | Barnes et al. . |
| 4,160,120 | 7/1979 | Barnes et al. . |
| 4,182,933 | 1/1980 | Rosenblum . |

(List continued on next page.)

OTHER PUBLICATIONS

Shmuely, Composite Diffie–Hellman Public–Key Generating Systems Are Hard to Break, Technion Technical Report, Feb. 1985.

Rabin, Digitized Signatures & Public–Key Functions As Intractable As Facturization, (date unknown).

Williams, A Modification of the RSA Public–Key Encryption Procedure, IEEE Transactions On Information Theory, vol. IT–26, No. 6, pp. 726–729 (Nov. 1980).

Miyaguch, The FEAL Cipher Family, Crypto '90 (Aug. 1990).

Shimizu, et al., FEAL–Fast Date Encipherment Algorithm, Systems & Computer in Japan, vol. 19, No. 7, pp. 20–34 (1988).

Federal Register, vol. 40, No. 52, Data Encryption Standard (Mar. 17, 1975).

Davies, et al., *Security for Computer Networks*, Chapters 3 (DES) and Chapter 4 (Block Cipher) pp 47–108 (Wiley 1984).

Rivest, *The MD5 Message–Digest Algorithm*, Apr. 1992.

RSA Brochure (undated).

Diffie, The First Ten Years of Public–Key Cryptography, Proceedings of the IEEE, vol. 70, No. 5, pp. 560–577 (May 1988).

(List continued on next page.)

*Primary Examiner*—Thomas R. Peeso
(74) *Attorney, Agent, or Firm*—Proskauer Rose LLP (57) ABSTRACT

A network security device is connected between a protected client and a network. The network security device negotiates a session key with any other protected client. Then, all communications between the two clients are encrypted. The inventive device is self-configuring and locks itself to the IP address of its client. Thus, the client cannot change its IP address once set and therefore cannot emulate the IP address of another client. When a packet is transmitted from the protected host, the security device translates the MAC address of the client to its own MAC address before transmitting the packet into the network. Packets addressed to the host, contain the MAC address of the security device. The security device translates its MAC address to the client's MAC address before transmitting the packet to the client.

3 Claims, 9 Drawing Sheets

U.S. PATENT DOCUMENTS

| | | |
|---|---|---|
| 4,185,166 | 1/1980 | Kinch, Jr. et al. . |
| 4,203,166 | 5/1980 | Ehrsam et al. . |
| 4,227,253 | 10/1980 | Ehrsam et al. . |
| 4,238,854 | 12/1980 | Ehrsam et al. . |
| 4,249,180 | 2/1981 | Eberle et al. . |
| 4,621,321 | 11/1986 | Boebert et al. . |
| 4,633,391 | 12/1986 | Rundell . |
| 4,701,840 | 10/1987 | Boebert et al. . |
| 4,713,753 | 12/1987 | Boebert et al. . |
| 4,727,579 | 2/1988 | Wright et al. . |
| 4,731,841 | 3/1988 | Rosen et al. . |
| 4,757,536 | 7/1988 | Szczutkowski et al. . |
| 4,799,153 | 1/1989 | Hann et al. . |
| 4,802,220 | 1/1989 | Marker, Jr. . |
| 4,829,560 | 5/1989 | Evanyk et al. . |
| 4,829,569 | 5/1989 | Seth-Smith et al. . |
| 4,837,822 | 6/1989 | Crosley et al. . |
| 4,901,348 | 2/1990 | Nichols et al. . |
| 4,910,777 | 3/1990 | Larson et al. . |
| 4,912,762 | 3/1990 | Lee et al. . |
| 4,916,704 | 4/1990 | Bruckert et al. . |
| 4,924,513 | 5/1990 | Herbison et al. . |
| 4,933,969 | 6/1990 | Marshall et al. . |
| 4,933,971 | 6/1990 | Bestock et al. . |
| 4,956,863 | 9/1990 | Goss . |
| 4,965,804 | 10/1990 | Trbovich et al. . |
| 4,980,913 | 12/1990 | Skret . |
| 4,991,207 | 2/1991 | Shiraishi et al. . |
| 5,001,755 | 3/1991 | Skret . |
| 5,056,140 | 10/1991 | Kimbell . |
| 5,070,528 | 12/1991 | Hawe et al. . |
| 5,086,469 | 2/1992 | Gupta et al. . |
| 5,161,192 | 11/1992 | Carter et al. . |
| 5,161,193 | 11/1992 | Lampson et al. . |
| 5,177,788 | 1/1993 | Schanning et al. . |
| 5,179,554 | 1/1993 | Lomicka et al. . |
| 5,182,554 | 1/1993 | Kaiser et al. . |
| 5,204,961 * | 4/1993 | Barlow . |
| 5,222,137 * | 6/1993 | Barrett et al. . |
| 5,222,140 * | 6/1993 | Beller et al. . |
| 5,245,656 * | 9/1993 | Loeb et al. . |
| 5,261,003 * | 11/1993 | Matsui . |
| 5,268,962 * | 12/1993 | Abadi et al. . |
| 5,272,754 * | 12/1993 | Boebert . |
| 5,276,735 * | 1/1994 | Boebert et al. . |
| 5,299,263 * | 3/1994 | Beller et al. . |
| 5,303,303 * | 4/1994 | White . |
| 5,309,437 * | 5/1994 | Perlman et al. . |
| 5,311,593 * | 5/1994 | Carmi ..................................... 380/23 |
| 5,331,637 * | 7/1994 | Francis et al. . |
| 5,351,295 * | 9/1994 | Perlman et al. . |
| 5,353,283 * | 10/1994 | Tsuchiya . |
| 5,361,359 | 11/1994 | Tajalli et al. . |
| 5,371,868 | 12/1994 | Koning et al. . |
| 5,386,470 | 1/1995 | Carter et al. . |
| 5,386,471 | 1/1995 | Bianco . |
| 5,394,402 | 2/1995 | Ross . |
| 5,394,469 | 2/1995 | Nagel et al. . |
| 5,406,628 | 4/1995 | Beller et al. . |
| 5,414,694 | 5/1995 | Crayford et al. ............... 370/94.1 X |
| 5,416,842 | 5/1995 | Aziz . |
| 5,432,850 | 7/1995 | Rothenberg . |
| 5,442,708 | 8/1995 | Adams, Jr. et al. . |
| 5,444,782 | 8/1995 | Adams, Jr. et al. . |
| 5,489,896 | 2/1996 | Sofer et al. . |
| 5,499,297 | 3/1996 | Boebert et al. . |
| 5,502,766 | 3/1996 | Boebert et al. . |
| 5,537,099 | 7/1996 | Liang ............................... 370/94.1 X |
| 5,548,646 | 8/1996 | Aziz et al. . |
| 5,548,649 | 8/1996 | Jacobson ............................... 380/49 |
| 5,550,984 | 8/1996 | Gelb . |
| 5,557,346 | 9/1996 | Lipner et al. . |
| 5,557,765 | 9/1996 | Lipner et al. . |
| 5,577,209 | 11/1996 | Boyle et al. . |
| 5,583,940 | 12/1996 | Vidrascu et al. . |
| 5,588,059 * | 12/1996 | Chandros et al. ..................... 380/21 |
| 5,588,060 | 12/1996 | Aziz ...................................... 380/30 |
| 5,590,201 | 12/1996 | Lo . |
| 5,596,718 | 1/1997 | Boebert et al. . |
| 5,600,722 | 2/1997 | Yamaguchi et al. . |
| 5,623,601 | 4/1997 | Vu ................................... 395/187.01 |
| 5,699,513 | 12/1997 | Feigen et al. ................... 395/187.01 |
| 5,737,638 * | 4/1998 | Byrn et al. ............................. 710/68 |
| 5,757,924 | 5/1998 | Friedman et al. . |
| 5,781,550 | 7/1998 | Templin ............................... 370/401 |
| 5,922,049 | 7/1999 | Radia et al. . |

OTHER PUBLICATIONS

Fahn, Answers to Frequently Asked Questions About Today's Cryptography, RSa Laboratories (Sep. 1992).

Linn, Privacy Enhancement for Internet Electronic Mail: Part I: Message Encryption and Authentication Procedures, Network Working Group, RFC 1421 (Feb. 1993).

McCurley, A Key Distribution System Equivalent to Factoring, Jun. 3, 1987.

Kaliski, Privacy Enhancement for Internet Electronic Mail: Part IV: Key Certification and Related Services, Network Working Group, RFC 1424 (Feb. 1993).

Kent, Privacy Enhancement for Internet Electronic Mail: Part II: Certificate–Based Key Management, Network Working Group, RFC 1422 (Feb. 1993).

Diffie, et al., Authentication and Authenticated Key Exchanges, Design, Codes, and Cryptography, 2, pp. 107–125 (1992).

Konigs, Cryptographic Identification Methods for Smart Cards in the Process of Standardization, IEEE Communications Magazine, vol. 29, No. 6, pp. 42–48 (Jun. 1991).

Ferreira, The Smart Card: A High Security Tool in EDP, Phillips TDS Review, vol. 47, No. 3, pp. 1–19, (Sep. 1989).

Day, et al., The OSI Reference Model, Proceedings of the IEEE, vol. 71, No. 12, pp. 1334–1340 (Dec. 1983).

Bellovin, Security Problems in the TCP/IP Protocol Suite, Computer Communication Review, col. 19, No. 2, pp. 32–40 (Apr. 1989).

Balenson, Pricacy Enhancement for Internet Electronic Mail: Part III: Algorithms, Modes, and Identifiers, Network Working Group, RFC 1115 (Feb. 1993).

Menezes, Qu, and Vanstone, "Some New Key Arrangement Protocols Providing Implicit Authentication," Arp. 24, 1995.

* cited by examiner

NETWORK SECURITY DEVICE

RELATED APPLICATION

This patent claims the benefit of U.S. Provisional Patent Application Serial No. 60/033,995 entitled "Improved Network Security Device", filed on Jan. 3, 1997 for Dr. Aharon Friedman and Dr. Eva Bozoki. This patent application is directed to improvements in the invention described in U.S. patent application Ser. No. 08/529,497 entitled "Network Security Device" and filed on Sep. 18, 1995. The contents of these two documents are incorporated herein by reference.

FIELD OF THE INVENTION

The present invention is directed to improvements in a network security device that is connected between a protected computer("the client") and a network and/or a protected local area network (LAN) and a wide area network (WAN) as well as a method for using the network security device.

BACKGROUND OF THE INVENTION
A. Network Architecture

Figure 1:
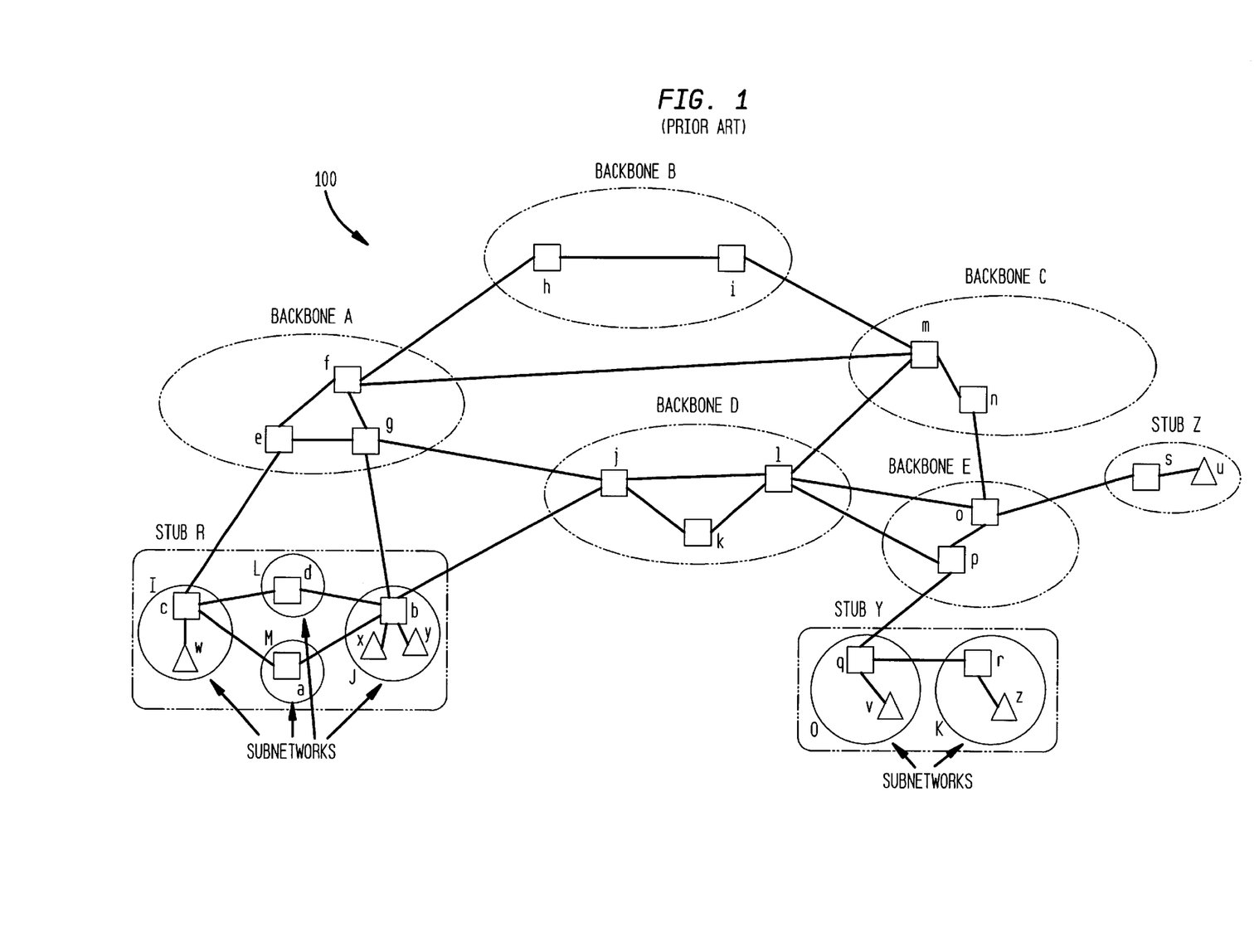
FIG. 1 schematically illustrates an Internet system.

An Internet communications network 100 is depicted in FIG. 1 including five transmit or backbone networks A,B, C,D, and E and three stub networks R, Y, and Z. A "backbone" network is an intermediary network which conveys communicated data from one network to another network. A "stub" network is a terminal or endpoint network from which communicated data may only initially originate or ultimately be received. Each network, such as the stub network R, includes one or more interconnected subnetworks I, J, L, and M. As used herein, the term "subnetwork" refers to a collection of one or more nodes, e.g., (c,w), (d), (a), (b,x,y), (q,v), (r,z), (s,u), (e,f,g),(h,i),(j,k,l),(m,n), and (o,p), interconnected by wires and switches for local internodal communication. Each subnetwork may be a local area network (or "LAN"). Each subnetwork has one or more interconnected nodes which may be host computers ("hosts") u,v,w,x,y,z (indicated by triangles) or routers a,b, c,d,e,f,g,h,i,j,k,l,m,n,o,p,q,r,s (indicated by squares). A host is an endpoint node from which communicated data may initially originate or ultimately be received. A router is a node which serves solely as an intermediary node between two other nodes; the router receives communicated data from one node and retransmits the data to another node. Collectively, backbone networks, stub networks, subnetworks, and nodes are referred to herein as "Internet systems".

Figure 2:
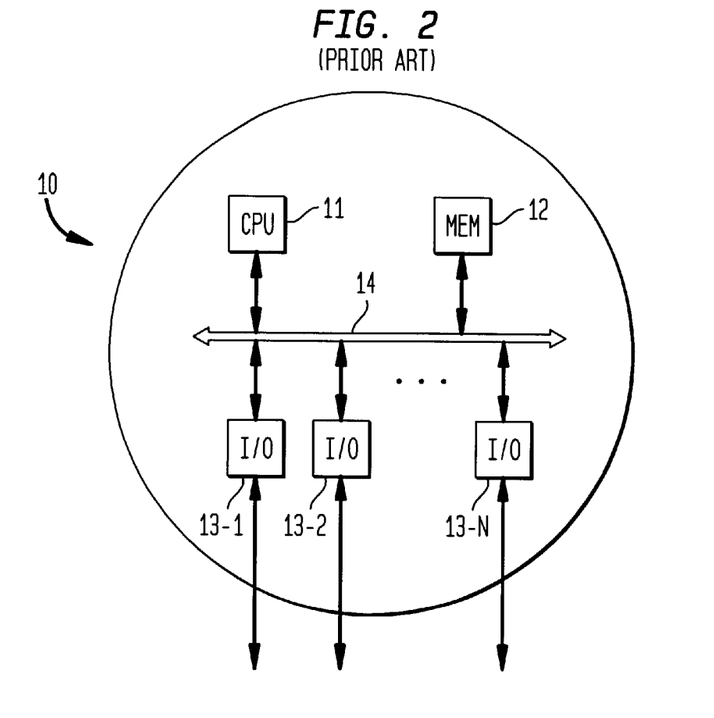
FIG. 2 schematically illustrates the architecture of a host in the network of FIG. 1.

FIG. 2 shows a block diagram of a host or router node 10. As shown, the node may include a CPU 11, a memory 12 and one or more I/O ports (or network interfaces) 13-1, 13-2, . . . , 13-N connected to a bus 14. Illustratively, each I/0 port 13-1, 13-2, . . . , 13-N is connected by wires, optical fibers, and/or switches to the I/O port of another node. The I/O ports 13-1, 13-2, . . . , 13-N are for transmitting communicated data in the form of a bitstream organized into one or more packets to another node and for receiving a packet from another node. If the host 10 is a host computer attached to a subnetwork which is an Ethernet, then the host will have an I/O port which is an Ethernet interface.

A host which initially generates a packet for transmission to another node is called the source node and a host which ultimately receives the packet is called a destination node. Communication is achieved by transferring packets via a sequence of nodes including the source node, zero or more intermediary nodes, and the destination node, in a bucket brigade fashion. For example a packet may be communicated from the node w to the node c, to the node d, to the node b, and to the node x.

Figure 3A:
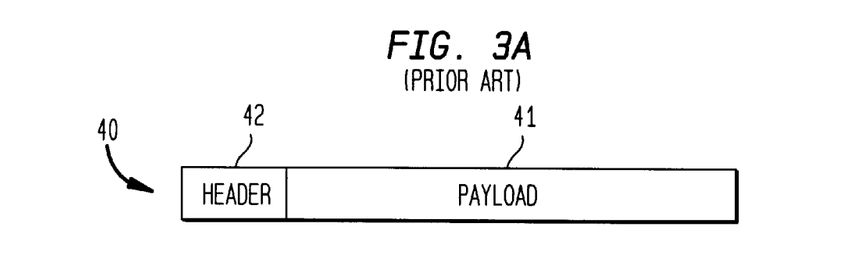
FIGS. 3A and 3B illustrate the format of a packet transmitted in the network of FIG. 1.

An exemplary packet 40 is shown in FIG. 3A having a payload 41 which contains communicated data (i.e., user data) and a header 42 which contains control and/or address information. Typically, the header information is arranged in layers including an IP layer and a physical layer.

The IP layer typically includes an IP source address, an IP destination address, a checksum, and a hop count which indicates a number of hops in a multihop network. A physical layer header includes a MAC (Media Access Control)address (hardware address) of the source and a MAC address of the destination.

The user data may include a TCP (Transfer Control Protocol) packet including TCP headers or a UDP (User Data Protocol) packet including UDP headers. These protocols control among other things, the packetizing of information to be transmitted, the reassembly of received packets into the originally transmitted information, and the scheduling of transmission and reception of packets (see e.g., D. Commer, "Internetworking With TCP/IP", Vol. 1 (1991); D. Commer and D. Stevens, "Internetworking With TCP/IP", Vol. 2 (1991)).

Figure 3B:
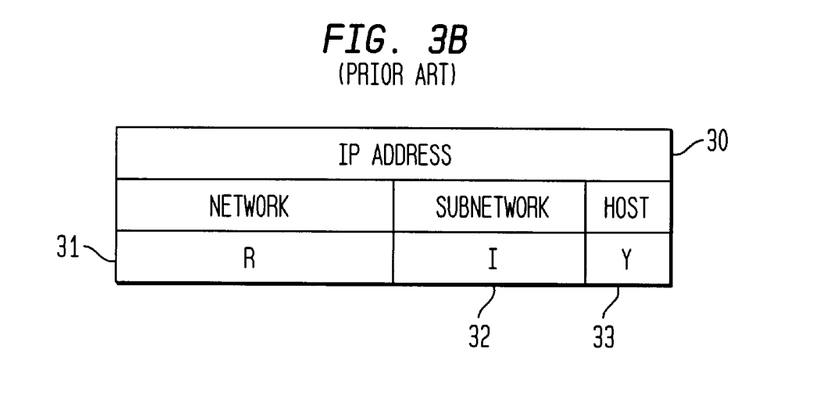

As seen in FIG. 3B, in an exemplary Internet protocol (IP), each node of the Internet 100 is assigned an Internet address (IP address) which is unique over the entire Internet 100 such as the Internet address 30 for the node y shown in FIG. 3B. See, Information Sciences Institute, RFC 791 "Internet Protocol", September, 1981. The IP addresses are assigned in an hierarchical fashion; the Internet (IP) address 30 of each node contains an address portion 31 indicating the network of the node, an address portion 32 indicating a particular subnetwork of the node, and a host portion 33 which identifies a particular host or router and discriminates between the individual nodes within a particular subnetwork.

In an Internet system 100 which uses the IP protocol, the IP addresses of the source and destination nodes are placed in the packet header 42 (see FIG. 3A) by the source node. A node which receives a packet can identify the source and destination nodes by examining these addresses.

In an Internet system, it is the IP address of a destination that is known, and the physical address (i.e., MAC address) to be placed in the MAC frame header is to be determined. If the destination host is on the same local area subnetwork (and this is easily determined by observing that the network part in both the source and destination IP addresses is the same), then the destination address that is to go into the MAC header destination address field is simply the physical address of the destination host. The MAC destination address may be found by means of the ARP (Address Resolution Protocol) which comprises having the source lost broadcast an ARP request packet with the IP address of the destination host and having the destination host respond with its hardware (MAC) address. This MAC address may be placed in the MAC frame (physical layer) headers.

B. Encryption Techniques

Eavesdropping in a network, such as the Internet system 100 of FIG. 1, can be thwarted through the use of a message encryption technique. A message encryption technique employs an encipherment function which utilizes a number referred to as a session key to encipher data (i.e., message content). Only the pair of hosts in communication with each other have knowledge of the session key, so that only the proper hosts, as paired on a particular conversation, can encrypt and decrypt digital signals. Three examples of encipherment functions are (1) the National Bureau of Standards Data Encryption Standard (DES) (see e.g., National Bureau of Standards, "Data Encryption Standard", FIPS-PUB-45, 1977), (2) Fast Encipherment Algorithm (FEAL) (see e.g., Shimizu and S. Miyaguchi, "FEAL-Fast Data Encipherment Algorithm," Systems and Computers in Japan, Vol. 19, No. 7, 1988 and S. Miyaguchi, "The FEAL Cipher Family", Proceedings of CRYPTO '90, Santa Barbara, Calif., August, 1990); and (3) International Data Encryption Algorithm ("IDEA") (see e.g., X. Lai, "On the Design and Security of Block Ciphers," ETH Series in Information Processing, v.1, Konstanz: Hartung-Gorre Verlag 1992). One way to use an encipherment function is the electronic codebook technique. In this technique a plain text message m is encrypted to produce the cipher text message c using the encipherment function f by the formula c=f(m, sk) where sk is a session key. The message c can only be decrypted with the knowledge of the session key sk to obtain the plain text message m=f(c,sk).

Session key agreement between two communicating hosts may be achieved using public key cryptography. (See e.g., U.S. Pat. Nos. 5,222,140 and 5,299,263).

Before discussing public key cryptographic techniques, it is useful to provide some background information. Most practical modern cryptography is based on two notorious mathematical problems believed (but not proven) to be hard (i.e., not solvable in polynomial time, on the average). The two problems are known as Factorization and Discrete-Log. The Factorization problem is defined as follows:

Input: N, where N=pq where p and q are large prime numbers

Output: p and/or q.

The Discrete-Log problem is defined as follows:

Input: P,g,y, where $y \equiv g^x$ mod P, and P is a large prime number

Output: x.

(The Discrete-Log problem can be similarly defined with a composite modulus N=pq).

Based on the Factorization and Discrete-Log problems, some other problems have been defined which correspond to the cracking problems of a cryptographic system.

One system of such a problem which has previously been exploited in cryptography (see, e.g., H. C. Williams, "A Modification of RSA Public-Key Encryption", IEEE Transactions on Information Theory, Vol. IT-26, No. Nov. 6, 1980) is the Modular Square Root problem, which is defined as follows:

Input: N,y, where $y \equiv X^2$ mod N, and N=pg, where p and q are large primes Output: x.

Calculating square roots is easy if p and q are known but hard if p and q are not known. When N is composed of two primes, there are in general four square roots mod N. As used herein, $z \equiv \sqrt{x}$ mod N is defined to mean that x is the smallest integer whereby $z^2 \equiv x$ mod N.

Another problem is known as the Composite Diffie-Hellman (CDH) problem, which is defined as follows:

Input: N, g, $g^x$ mod N, $g^y$ mod N, where N≡pq and p and q are large primes.

Output: $g^{xy}$ mod N.

It has been proven mathematically that the Modular Square Root and Composite Diffie-Heliman problems are equally difficult to solve as the above-mentioned factorization problem (see, e.g., M. O. Rabin, "Digitalized Signatures and Public Key Functions as Intractable as Factorization", MIT Laboratory for Computer Science, TR 212, January 1979; Z. Shmuely, "Composite Diffie-Hellman Public Key Generating Schemes Are Hard To Break", Computer Science Department of Technion, Israel, TR 356, February 1985; and K. S. McCurley, "A Key Distribution System Equivalent to Factoring", Journal of Cryptology, Vol. 1, No. 2, 1988, pp. 95–105).

In a typical public-key cryptographic system, each user I has a public key $P_i$ (e.g., a modulus N) and a secret key $S_i$ (e.g., the factors p and q). A message to user I is encrypted using a public operation which makes use of the public key known to everybody (e.g., squaring a number mod N). However, this message is decrypted using a secret operation (e.g., square root mod N) which makes use of the secret key (e.g., the factors p and q).

C. Network Security Devices

At present, existing network security products are categorized into two classes: (1) firewalls, such as Janus and ANS, and (2) software products, such as encrypted mail, secured http, one time password, etc.

A firewall is a dedicated computer, usually running a Unix operating system. It acts as a filter for incoming and outgoing communications. The firewall is placed as a router between the local area network (LAN) and the outside world. The decision whether to pass a packet is made based on the source and/or destination IP address, and the TCP port number. Some firewalls also have the ability to encrypt data, provided that both sides of the communication employ the same brand of firewall. Some firewalls have a personal authentication feature.

Software products are based on the premise that the computer on which they are installed are secure, and protection is only needed outside on the network. Thus, such software products can easily be bypassed by breaking into the computer. A typical scheme is when an intruder implants a "Trojan Horse" on a computer which sends him an unencrypted copy of every transaction. Sometimes, it is even done as a delayed action during the off-hours when the computer is not likely to be supervised.

In addition, there are authentication products designed to maintain the integrity of the computer against intrusion. These products are based on the premise that the products are 100% secure. Once the product is compromised, it becomes totally ineffective. Sometimes, careless use by one user may jeopardize all other users of the product.

Firewalls are more effective in maintaining network security. However they are very expensive. Their price range is between $10,000 and $50,000, plus the price of the hardware. They require a high level of expertise to install and maintain. The most sophisticated and effective firewalls require a specially trained technician or engineer for their maintenance. The special training cost is up to $10,000 per person, and the salary adds $60,000 to $120,000 or more per annum to the cost.

Firewalls have to be constantly maintained, modified, and monitored in order to yield reasonable security. They only cover the TCP part of the Internet Protocol and not the UDP part. Thus, they do not provide security to NFS (Network File Services) and many client/server applications.

The firewall is a full service computer which can be logged into for maintenance and monitoring. Thus, it can be broken into. Once a firewall is compromised it loses its effectiveness and becomes a liability rather than a security aid. Firewalls only protect the connection between a LAN and a WAN (Wide Area Network). It does not protect against intrusion into a particular host from within the LAN.

In view of the foregoing, it is an object of the present invention to provide a network security device which overcomes the shortcomings of the prior art network security devices.

It is another object of the present invention to provide a hardware device to provide network security for individual hosts attached to a network.

It is a further object of the present invention to provide a hardware device to provide network security for a local area network connected to a wide area network.

SUMMARY OF THE INVENTION

The present invention provides improvements to the Network Security Device described in U.S. patent application Ser. No. 08/529,497. These improvements include (1) modifications in the device which adapt it to protect a LAN, (2) improved key generation, (3) an improved key exchange algorithm, and (4) improved packet handling procedures which provide double integrity checks.

A preferred embodiment of the inventive network security device comprises a first network interface connected to a protected client, a second network interface connected to a portion of a network, and a processing circuit connected to both interfaces.

A communication from the protected client goes from the client, to the first interface, to the processing circuit, to the second interface and into the network. Similarly, a communication received from the network goes from the second interface, to the processing circuit, to the first interface and to the protected client.

A preferred embodiment of the present invention has four keys associated with it:

(1) a static (permanent) private key;
(2) dynamic (changing) private key;
(3) a static public key; and
(4) a dynamic public key.

In a preferred embodiment, the public keys are exchanged between two network security devices in order to establish a common secret key. The common secret key is the key which is used to encrypt/decrypt all messages between two particular devices. This key should not be transmitted.

The static keys are permanent keys unique to each device. The dynamic keys have a predetermined lifespan and are replaced periodically, such as every 24 hours. Preferably, the static keys are generated using a seed derived from the host's IP address, MAC address of the network interface connected between the protected host and the network security device, and the security device's serial number. Preferably, the dynamic keys are generated using seeds derived from current date and time information.

Packets received from the protected client are encrypted using an encipherment function such as IDEA, FEAL, or DES before being transmitted via the network to a destination. Similarly encrypted packets received from a destination are decrypted. Such encryption and decryption requires a common session key to be possessed jointly by the protected client and the destination (the destination being a protected client of another network security device located someplace else in the network).

The common crypto key (i.e., the common secret key) is obtained using a public key cryptography technique. To aid in the key exchange, the network security device maintains two databases. A static database (SDB) contains information about secured hosts or nodes in the network. A secured host or node is a host or node that is protected by a network security device. Each entry in the static database contains information about a particular secured host, i.e., the host IP address, time entered in the database, and the host's permanent public key.

A dynamic data base (DDB) contains information about secured and unsecured hosts. Each entry in the dynamic database includes a host's IP address, the time that the host's dynamic key was generated, a flag indicating whether or not the host is secured, a flag indicating whether the host is in transition (i.e., in the middle of a key exchange), and a pointer to a common secret session key.

The protocol used by the network security device of host i to agree on a common crypto key with a network security device of host j is as follows.

Consider a communication from host i to host j. The communication arrives at the network security device of host i from host i. The network security device checks if host j is in the dynamic database. If host j is in the dynamic database, it is determined if the dynamic database has a common crypto key for communication between host i and host j. If there is such a common session key, the communication from host i is encrypted using the common crypto key and transmitted to host j. If there is no common crypto key, then host i sends the dynamic part of its public key $P_i$ to host j and host j replies by sending the dynamic part of its public key $P_j$ to host i. The exchange of dynamic parts of the public keys may be encrypted using the static part of the public keys, which may be obtained from the static databases at host i and host j. The common crypto key is then calculated according to a Diffie-Hellman technique.

Because the dynamic keys of each network security have a particular lifespan, such as 24 hours, there may be a time difference between times when two device's keys expire. Thus, it is possible that one device's dynamic key may expire before the packet is received. One way to prevent this occurrence is to take into account this time difference. The DDB may correct the time difference between the time the packet was sent and the time the packet is received. Also, the DDB time generation entry indicates to the network security device when the other party's dynamic key expires. Thus, when a communication between the nodes is initiated, it may be determined whether a new dynamic key exchange is warranted, rather than attempting to use an expired common dynamic key.

Note that this assumes that there is an entry for host j in the static database of host i. If there is not, the exchange of dynamic public keys is preceded by an exchange of static public keys and the forming of a database entry for host j in the static database at host 1. Moreover, if there is no entry for host j in the dynamic database of host 1, such an entry will be generated before the dynamic key exchange.

A packet received by the network security device and the connected host is preferably processed in the following manner. The IP and MAC headers from the packet are copied into a new IP packet. The client host's physical address (e.g., the MAC address of the network interface between the client and the network security device) is replaced with the network security device's MAC address (e.g., the MAC address of the network interface between the network security device and the network). The new IP packet includes a proprietary header and proprietary tail. Information about the packet is stored in the proprietary tail, including check sum information. The data and proprietary tail are then encrypted. The proprietary header is then filled in, including check sum information for the encrypted data. This packet is then transmitted into the network.

This processing method provides a double integrity check. The check sum which was calculated after encryption is checked by the receiver before decryption, providing an integrity test of the encrypted data in transit. The check sum in the proprietary tail was calculated before encryption and checked by the received after decryption. This checksum provides a means of strong authentication because the static and dynamic keys used to encrypt the checksum are known only to the two communicating hosts. This check sum will differ if the common secret key is not identical on both sides and also provides an integrity test of the actual data. Note that if the check sum is replaced with a secured hash function, after the packet is encrypted, it becomes a digital signature. It should be noted that encryption takes place at the IP level so that TCP and UDP packets are encoded.

In short, the inventive network security device has a number of significant advantages.

Like a firewall, the inventive network security device is a hardware/software combination in a preferred implementation. However, it is a sealed "box" and cannot be logged into. Hence, it cannot be compromised the way a firewall can. It is much cheaper than a firewall. Thus, each node in the LAN can be equipped with it. This way, it provides protection inside the LAN as well as outside. The network security device works directly at the IP level. It therefore, covers all types of IP protocols and requires no special configuration to different network applications. Thus, the inventive network security device is maintenance free.

BRIEF DESCRIPTION OF THE DRAWINGS

The present invention is described with reference to the following figures.

DETAILED DESCRIPTION OF THE INVENTION

Overview of the Invention

Figure 4A:
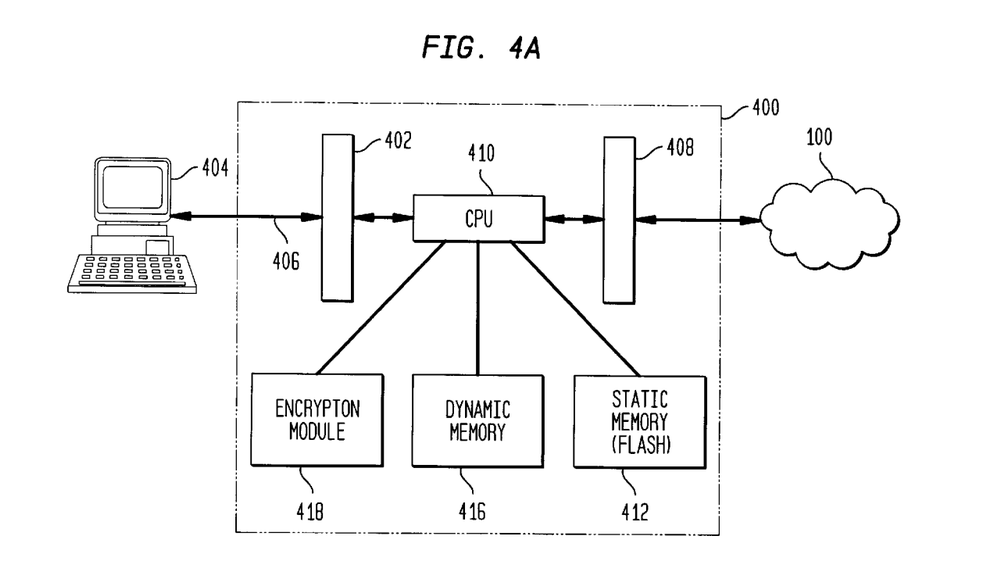
FIG. 4A illustrates a network security device for use with a host in the network of FIG. 1 in accordance with an embodiment of the present invention.

FIG. 4A schematically illustrates a network security device for protecting a host according to an embodiment of the invention. The security device 400 comprises a first interface 402 which is connected to the client host 404. Specifically, the interface 402 is connected to a network interface in the client host 404 (e.g., an interface 13 of FIG. 2) via a cable or wire 406. The security device 400 comprises a second interface 408 which is connected to a portion of a network 100. Illustratively, the interface 408 is connected to an Ethernet so that the interfaces 402, 408 are Ethernet interfaces such as SMC Elite Ultra Interfaces.

Figure 4B:
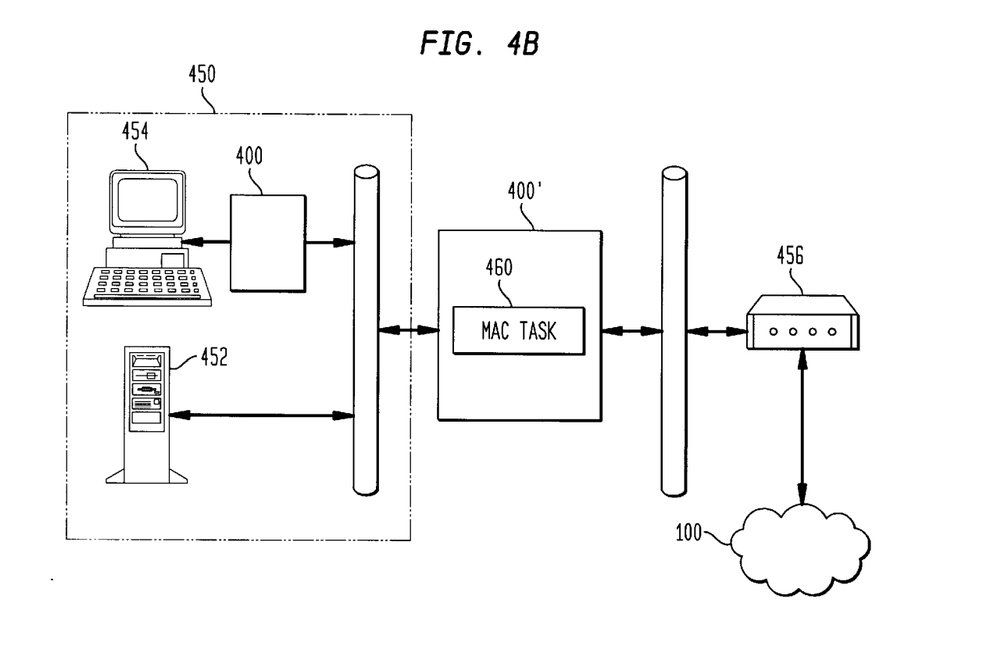
FIG. 4B illustrates a network security device for use with a LAN in accordance with an embodiment of the present invention.

FIG. 4B schematically illustrates a network security device 400' for protecting a LAN according to an embodiment of the invention. As seen in FIG. 4B, a network security device 400' according to the invention is connected between a LAN 450, such as an Ethernet network (including, for example, a file server 452 and a workstation 454), and a router 456 which routes communications between the LAN 450 and a WAN 100, such as the Internet. As discussed in detail below, several modifications are made in the Network Security Device to adapt it for use in protecting a LAN. As also seen in FIG. 4B, network security devices may be arranged in a cascaded topology. Note that workstation 454 is associated with a network security device 400.

Returning to FIG. 4A, a CPU 410 is connected to the interfaces 402, 408. The CPU is, for example, an Intel 486 DX 62-66 or Pentium. Alternatively, the processing circuit may be implemented as one or more ASICs (Application Specific Integrated Circuits) or a combination of ASICs and a CPU. A static memory 412 (e.g., flash EEPROM) is also connected to the CPU 410 and a dynamic memory 416 (e.g., RAM) is connected to the CPU 410. An optional encryption module 418 may be provided to perform encryption and large number arithmetic operations. The encryption unit may be implemented as a programmable logic array. Alternatively, the encryption module 418 may be omitted and its function may be carried out using a software program which is executed by the CPU 410. However, because certain encryption functions are calculation intensive, it may be preferable to separate the encryption functions from other functions of the Network Security Device 400.

The software executed by the CPU 11 preferably has three components: (1) operating system, (2) networking system, and (3) key computation algorithms. The operating system and the networking system may both be part of a Unix-like kernel. The key computation algorithms reside in memory and are signaled into action by the networking system. The operating system is a lobotomized Linux system with all drivers taken out except the RAM, disk, and Ethernet interfaces. The networking system is for communication, key exchange, encryption, configuration, etc. In a preferred embodiment, the key computation software may run independently of the other software. This shifts the computationally intensive task of key computation away from the operating system and networking system.

Figure 5:
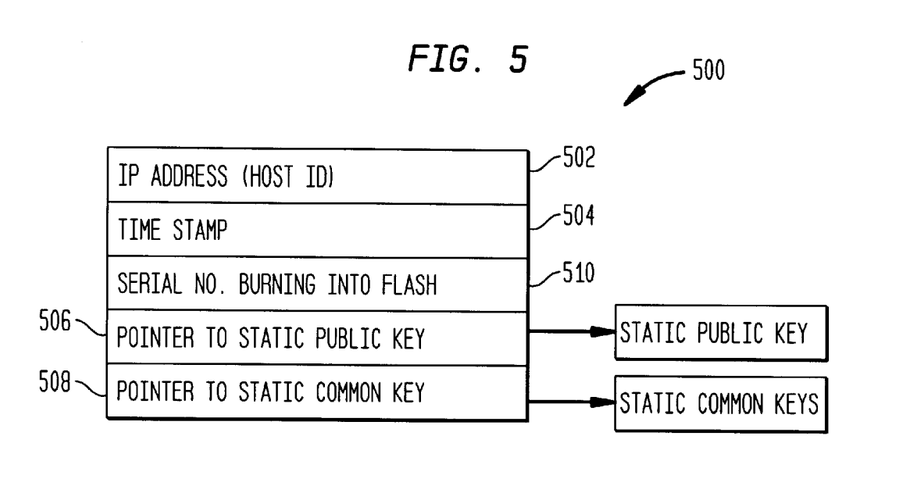
FIG. 5 illustrates an entry in a static database maintained by the network security device of FIG. 4.

The CPU 410 maintains two databases. One database is a static database (SDB) 412 preferably stored in a permanent memory, such as a Flash ROM 412. FIG. 5 illustrates one entry in the SDB 412. The SDB may have an entry for the client host as well as other hosts. As seen in FIG. 5, the static database entry 500 contains permanent information about the network security device 400 and other secured nodes in the network. The static database entry 500 may include the following information about another secured node: the other node's IP address 502, time that this other node was entered into the database 504, the node's permanent public key 506, and a pointer to the static common key shared by the network security device 400 and the other node's device 508. The static database 500 may also contain the IP address and the serial number of the connected host 510.

Figure 6:
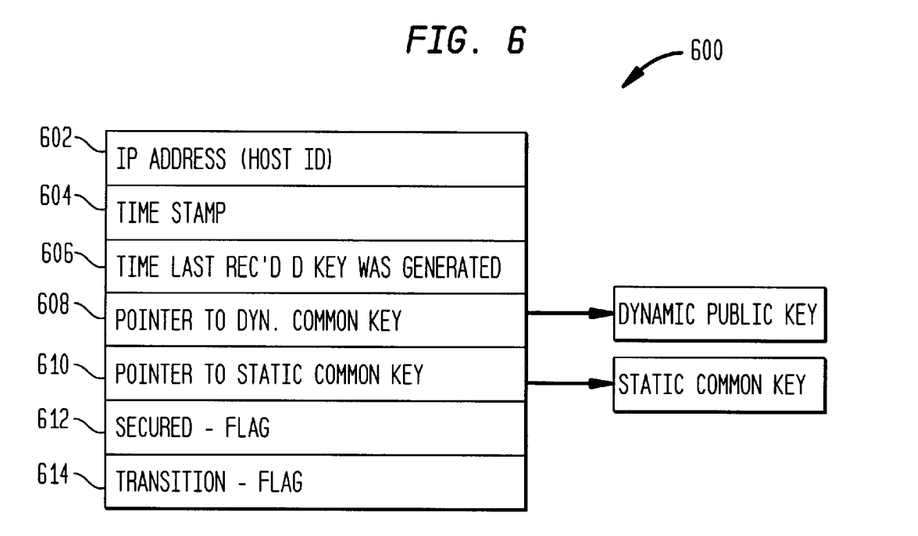
FIG. 6 illustrates an entry in a dynamic database maintained by the network security device of FIG. 4.

A second database is a dynamic database (DDB) 416, which may be stored in a volatile memory, such as a RAM. FIG. 6 illustrates one entry in the DDB 416. As seen in FIG. 6, the dynamic database entry 600 contains information about secured and unsecured nodes, i.e., the other node's IP address 602, the time a last packet was sent from that other node 604, a time the other node's dynamic key was generated 606, a pointer to a common secret key shared with that node, time last updated, a secured flag indicating whether the node is secured (e.g., has its own network security device) 602, and a transition flag indicating whether the node is in transition (i.e., in the middle of a key exchange).

Briefly, a preferred embodiment of the present invention operates in the following manner. The interface 402 is put in a promiscuous mode. In this mode, the interface 402 passes all communications from the client host 404 that are sensed on the cable 406 to the CPU 410. The network connection is via the interface 408 which is set to the same IP address as the client 404. The network security device 400 responds to the Address Resolution Protocol by sending its own (rather than the client's) MAC address. This adds a level of security by blocking attempts to bypass the device 400 using the Ethernet protocol.

Received communications are checked to see if they are from a secured host. First, the DDB entry 600 is checked to determine if there is a current dynamic common key shared with the node sending the communication. If yes, this key is used to encrypt and decrypt subsequent packets. If no, if these nodes have communicated previously, a dynamic key exchange is performed. If it is the first time these nodes have communicated, a static key exchange is performed to obtain a static dynamic key. This static key is used to encrypt and decrypt the dynamic key exchange communications.

Activation and Initialization

In a preferred embodiment, the network security device 400 is a sealed box which cannot be logged into. The network security device 400 senses this IP (and/or MAC) address of the client host 404 and locks itself to it. Once the network security device is locked to the address, the client 404 is prevented by the network security device 400 from changing its IP (and/or MAC) address.

Preferably, before the network security device 400 is placed into service, it is activated. The role of activation is to allow or disallow burning the host's 404 IP address into an entry 500 in the static database 412. As discussed above, the SDB 412 may have an entry 500 for the connected client host. The network security device's serial number (element 510) and the time of activation (element 504) may also be burned into the static database entry 500. As discussed below, these values may be used to generate a seed for the network security device's static private key.

Figure 7:
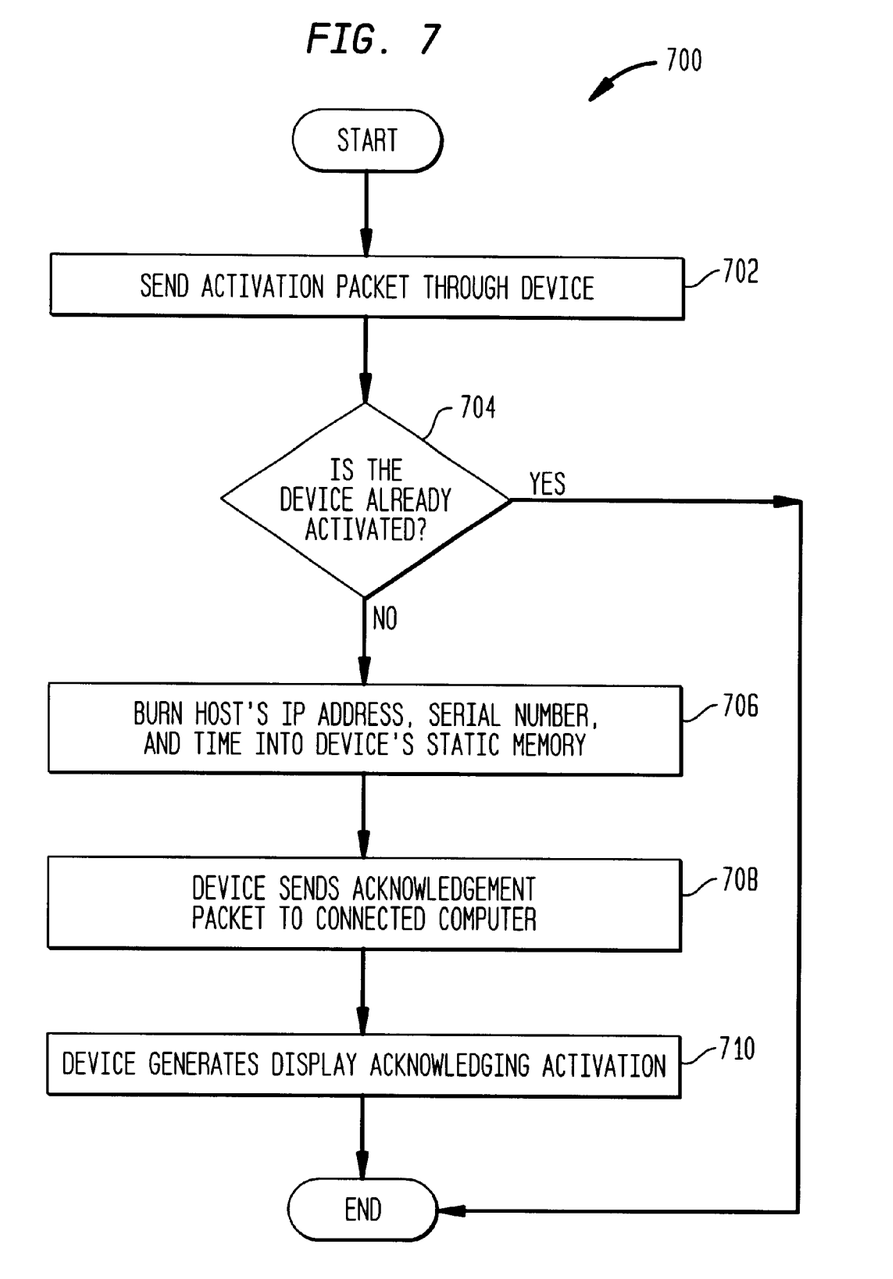
FIG. 7 is a flow chart illustrating an activation method used by the network security device of FIG. 4.

FIG. 7 is a flowchart 700 illustrating a preferred activation method. First, an "activation packet" containing an activation string in the payload may be sent from a connected computer, such as a host 404, through the network security device 400 (step 702). The packet is received by the device 400, which determines whether it has been activated (step 704). If it has not been activated, the IP address and other information are written into the flash memory (step 706), as described above, and an acknowledgment packet is returned to the computer (step 708). The device 400 may also generate a confirmation message for display on a monitor of the connected computer (step 710). The Address Resolution Protocol (ARP) is the protocol which is used to resolve an IP address into a matching Ethernet machine (MAC) address which is the actual address to which the network interface responds. As discussed above, the inventive network security device uses ARP (Address Resolution Protocol) to configure itself and hide the client host. The manner in which the network security device processes an ARP request is described in related application Ser. No. 08/529,497, the contents of this description are incorporated herein by reference.

Key Calculation

A preferred embodiment of the present invention has four keys associated with it:

(1) a static (permanent) private key;

(2) dynamic (changing) private key;

(3) a static public key; and (4) a dynamic public key.

In a preferred embodiment, the private keys are 128 bits long and are known only to that network security device. In a preferred embodiment, the public keys are 512 bits long and are revealed to others. Public keys, as described above, are exchanged between two network security devices in order to establish a 128 bit long common secret key. The common secret key is the key which is used to encrypt/decrypt all messages between two particular devices. The common secret keys should never be transmitted.

In a preferred embodiment, the keys are generated when the device 400 is turned on. As described in detail below, the static keys are permanent keys unique to each device and the dynamic keys have a predetermined lifespan and are replaced periodically, such as every 24 hours.

Static Keys

Keys are generated using a "seed", or number, which is then processed to generate a key. The seed for a randomly generated static private key for a particular network security device 400 is derived from the device's IP-address, MAC-address, serial number, and a time-stamp. The seed may be determined in the following manner:

$$seed = IP + MAC_l + MAC_h + serial + time$$

where:

$MAC_l$ is the low four bytes of the device's six byte MAC address;

$MAC_h$ is the high two bytes of the MAC address.

Using this seed, a private key (preferably 128 bits long), is then randomly generated using a random number generator, such as the GNU Multiple Preciscion library copyrighted by Free Software Foundation Inc. (1996), Boston, Mass., 02111. If the box is non-activated, the seed is the present time, thus it will be different every time the box is turned-on. On the other hand, for activated boxes, the static private key is a property of the box, it will not change by turning the box on/off.

Dynamic Keys

The dynamic private key is randomly generated at predetermined intervals. For example, dynamic keys may be generated every 24 hours. Preferably, the dynamic keys are derived from a random seed obtained from seconds, minutes, and hours of the present time. The dynamic secret key may be processed from the seed using a random number generator, such as the GNU Multiple Precision library Public Keys The static and dynamic public keys are calculated from the private keys according to the equation:

$$X_i \equiv q^{x_i} \pmod{n}$$

where:

$X_i$ is the public key;

$x_i$ is the private key;

and q and n prime numbers which are preferably installed in each network security device.

Key Exchanges

Figure 8:
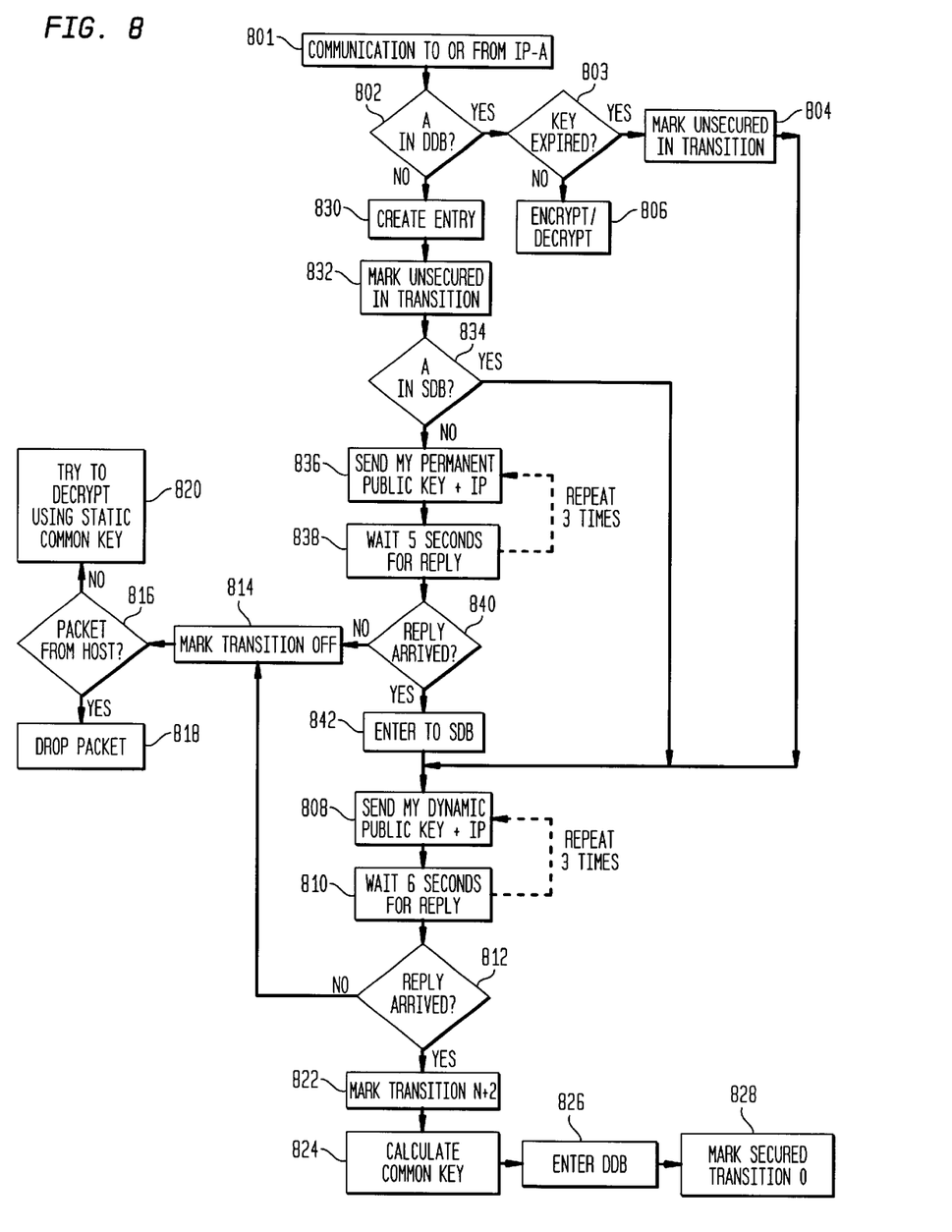
FIG. 8 is a flowchart illustrating a key exchange method used by the network security device of FIG. 4.

The first time a client 404 or LAN 450 sends a message to another network security device, a protocol is executed by which the two devices (i) exchange static public keys (unencrypted), (ii) generate a static common key, and then (iii) exchange dynamic public keys encrypted with their static common key. FIG. 8 is a flowchart 800, illustrating the key exchange algorithm.

Consider the case where the host client wants to send a communication to a node in the network whose IP=A. When the communication arrives at the network security device of the host client the dynamic data base 416 (DDB) is checked to determine if there is an entry 600 for node A in the dynamic data base (step 702).

Note that the DDB includes an entry for a "secured" flag 612 and a "transition" flag 614. The secured flag indicates the current security status between the two network security devices. Preferably, the secured flag may be in one of five states:

0=unsecured

1=secured

2=other party was secured, but now does not respond to dynamic key exchange request (i.e., other party has an entry in the SDB 500 but no current entry in the DDB 600)

3=the device's dynamic key has expired and must renegotiate all dynamic keys

4=cannot allocate key storage for the other party's key

The transition flag 614 indicates the status of a key exchange. Preferably, the transition flag maybe in one of four states:

0 not in transition $i \leq N$ waiting to receive a dynamic public key packet

N+2 waiting for a dynamic common key calculation $-i \geq -N$ waiting for static public key packet $-(N+2)$ waiting for a static common key calculation where N is the maximum number of tries, and i is the actual number of tries. As discussed in detail below, if there is no entry 600 in the DDB 416, the SDB 412 is searched for an entry 500 corresponding to node A.

The database searches return:

(i) a transition flag; and (ii) and a reference to the entry number in the database.

The "transition" and "secured" flags in the DDB may then be set accordingly. The following table sets out possible outcomes of a DDB/SDB search.

Possible Outcomes of Database Search.

| | Need dynamic key | Need static key have nothing to decrypt with | Not asking for any key | Comments |
|---|---|---|---|---|
| Trans | 1 | −1 | 0 | |
| Return | 0 | 0 | 0 | have nothing to en/decrypt with (no entry in DDB) |
| | −(i + 1) | | −(i + 1) | use st-key to en/decrypt |

-continued

Possible Outcomes of Database Search.

| Need dynamic key | Need static key have nothing to decrypt with | Not asking for any key | Comments |
|---|---|---|---|
| | | +(i + 1) | use dyn-key to en/decrypt |
| | | −(DB size + i + 1) | have st-key in DB, but no dyn-key response (do not encrypt, but use st-key to decrypt) |

Where DB size is the number of entries i for node A in the entry number in the dynamic database.

Returning to FIG. 8, if there is an entry for node A in the dynamic data base, a check is made to see if a common dynamic key for node A and the protected client has expired (step 803).

If, for example, there is an entry for node A and the secured flag=1, then node A is secured. Thus, the common dynamic key has not expired and the packet is encrypted using the session key and an encipherment function such as IDEA (step 806).

If the common dynamic key has expired, the dynamic data base entry for the node IP=A has a secured flag=3 and the transition flag is $i \leq N$ (step 804) which means a key exchange is taking place.

The exchange of the dynamic parts of the public keys of the host client and the node with IP=A proceeds as follows. The host client (i.e., the source) sends its dynamic public key and IP address to the node with IP=A (the destination) (step 808) and waits for a reply (step 810). The dynamic public key of the host may be encrypted with the static public key of the node with IP=A. The reply is the dynamic public key of the destination node with IP=A. This may be encrypted with the static public key of the host client. Steps 808 and 810 may be repeated several times, such as three times.

If no reply is received (step 812) from the destination, the source network security device sets the secured flag to 2 and the transition flag to 0 (step 814) in the DDB entry for the destination. If the packet to be encrypted originated from the host (step 816), the packet may be dropped (step 818). If the packet originated from another party, the network security device may try to decrypt the packet using the static private key (step 820).

If a reply is received, the transition flag for the destination node in the DDB entry 600 of the network security device of the host is set to N+2 (step 822), indicating that the common dynamic key is being calculated. Then a common dynamic (crypto) key for the source and destination is calculated by the network security device of the source (step 824) using, for example, a Diffie-Hellman technique as described above. The common session key is then entered into the DDB entry 600 of the source network security device (step 826) and the transition flag for this DDB entry is marked 0 (step 828) because the transition is complete. The secured flag=1.

The exchange of dynamic public keys and the calculation of a common crypto key assumes that there is an entry for the destination node with IP=A in the static data base 412 (SDB) of the source network security device and in the dynamic data base 416 of the source network security device. That is, that these two network security devices have communicated before. If these entries do not exist (i.e., these two devices have not previously communicated), they may be created prior to the dynamic public key exchange (steps 708–722 described above).

If there is no DDB entry for node IP=A (step 802), an entry is created (step 830), the secured flag=0, and the transition flag is marked $-i \geq -N$ (step 832). The SDB 500 is checked to determine if the source network security device has an entry for node IP=A (step 834).

If there is such an entry, proceed with the dynamic key exchange (steps 808–822), the secured flag is set to 1 and the transition flag is set as described above.

If there is no entry for node A in the SDB, then the network security device 400 sends its static public key in a key-packet to node A and drops the original IP-packet (step 836). The device waits a predetermined time, such as five seconds, for a reply (step 838). Steps 836 and 838 may be repeated several, e.g., three times. While waiting for a response, the transition flag is $-i \geq -N$. If a reply is received (step 840), an entry is created in the SDB (step 842), the secured flag=1 and the transition flag is 0. When the static key is received, the network security device calculates a common static key using its static key and a standard Diffie-Hellman technique. The transition flag is set to $-(N+2)$. Once the static common key is calculated, it is used to encrypt the dynamic key exchange (steps 808–822). The inventive device preferably uses the well-known Diffie-Hellman key exchange protocol.

If no reply is received, the secured flag=2 and the transition flag in the entry in the DDB is 0 because the transition off (step 814).

Both the static and the dynamic key request maybe repeated $N_{try}$ times at not less then $t_{expire}$ time intervals (in a preferred embodiment they are set to 8 tries and 2 ms, respectively). Note that entries in the SDB are burned in and are permanent. Entries in the DDB may be volatile, that is, the entries may be overwritten or lost if the device 400 is turned off.

Note that if the second flag for another node is set at either 2, 3, or 4, the network security device will continue to attempt a dynamic key exchange every predetermined period, such as every five minutes.

Expiration of the Dynamic Keys and Synchronization

As indicated above, the dynamic keys have a predetermined lifespan. For example, new dynamic keys may be generated every 24 hours. When the lifespan expires, all of the dynamic common key entries, which were calculated using an expired dynamic key, for other nodes are incorrect. Thus, all secured flags in the DDB are marked as secured=3. When the dynamic key of a network security device's 24 hours expires, a new dynamic key is generated. The secured flag is then changed back to 1 (or 2) when the next packet (sent to or received from that IP-address) initiates a successful dynamic key exchange.

Because the dynamic keys of each network security device have a particular lifespan, such as 24 hours, there may be a time difference between times when two device's keys expire. For example, if two devices in different time zones are both programmed to generate new dynamic keys at midnight, there may be several hours difference between key expiration times. Thus, it is possible that one device's dynamic key may expire during a communication. Also, because Internet communications are connectionless, that is, the receiving party does not have to be connected to the sending party when the packet is transmitted, one or the other party's dynamic key may have expired before the packet is received.

One way to prevent this occurrence is to take into account this time difference. Referring back to FIG. 6, the DDB entry 600 contains an entry "time generated" 606, which indicates the time that the other device's dynamic key was generated. This is done by correcting the "time generated" entry by the time difference between the time the packet was sent (the time stamp entry 604 in the DDB entry) and the time the packet is received (the present time).

Also, the time generated 606 entry indicates to the network security device 400 when the other party's dynamic key expires. Thus, when a communication between the nodes is initiated, it may be determined whether a new dynamic key exchange is warranted, rather than attempting to use an expired common dynamic key.

During a dynamic key exchange, one party may have received the other party's dynamic key. The other side, however, may be calculating the common dynamic key and sending dynamic key requests encrypted with the static common key. To avoid having to drop the packet, if a received packet cannot be decrypted with a dynamic key, the device tries to decrypt the packet using the static key. As a result, the packet is dropped only if the packet cannot be decrypted with the static key, that is, if it is an illegal packet.

Receiving a Key Packet

When a network security device receives an IP-packet containing another party's static or dynamic public key (sent either as a reply to a key-request or as an initiation for a key exchange), the public key is extracted from the packet and sent to either the CPU 410 or the encryption module 418 for further processing. There the shared secret key is calculated from the device's own private key and the other party's just received public key.

As discussed above, these tasks are calculation-intensive, and it may be preferable to provide a separate structure, such as the encryption module 418, so that the throughput of the entire device is not affected.

Packet Processing

Figure 9:
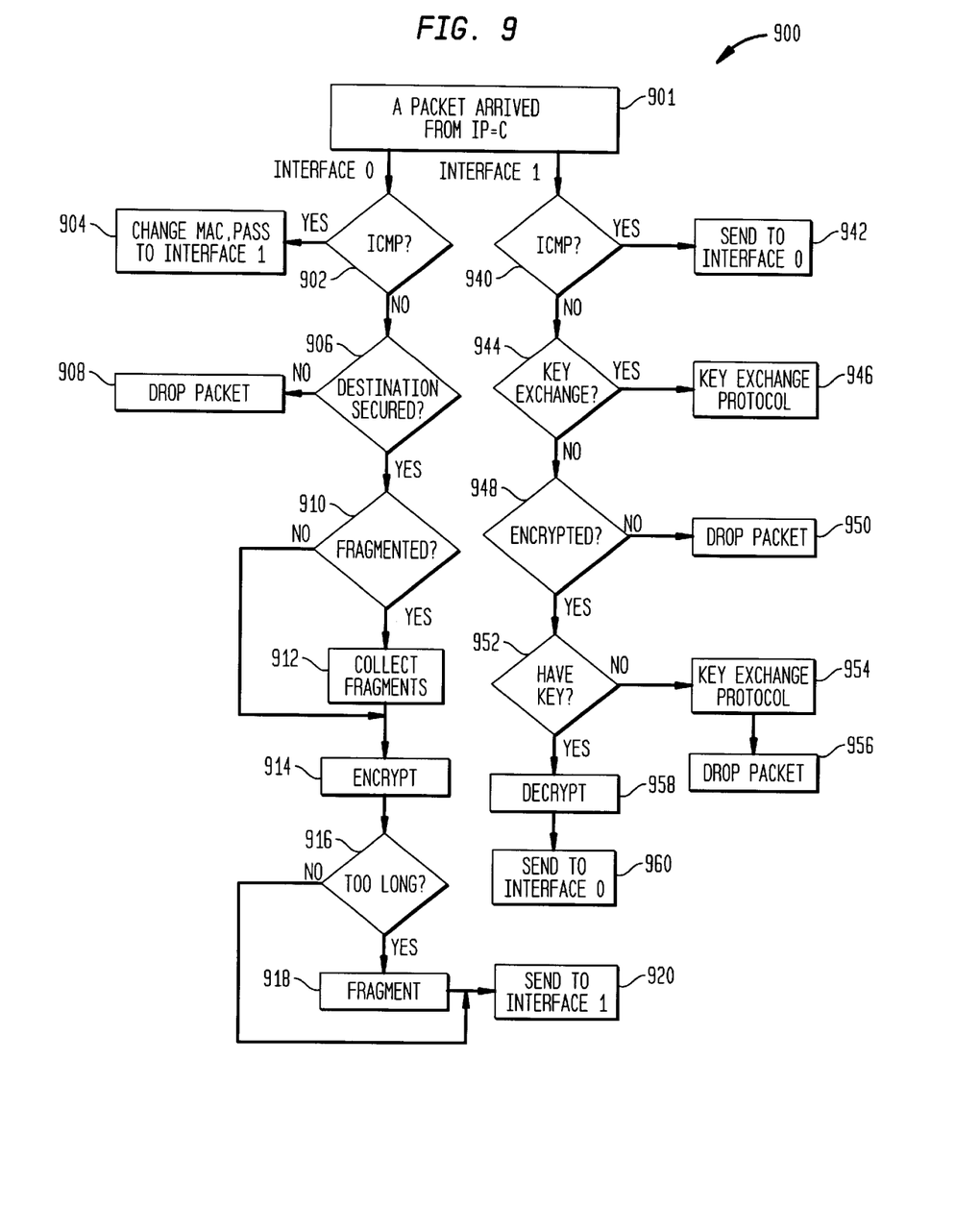
FIG. 9 is a flow chart illustrating an IP packet handling algorithm utilized by the network security device of FIG. 4.

FIG. 9 is a flowchart 900 illustrating a packet handling algorithm utilized by the inventive network security device. Illustratively, the packet arrives with the source address IP=C (step 901). The packet may arrive from the connected host at interface 402 or from the network at interface 408.

First consider the case where the packet arrives from the host at interface 402. If the packet carries an ICMP (Internet Control Message Protocol) or IGMP (Internet Gateway Message Protocol) identification (step 902), the packet is passed to the interface 408 without encryption. However, the source MAC address in the packet is translated to the MAC address of interface 408 (step 904). ICMP and IGMP Packets are not addressed to a destination host. Rather these packets are utilized by intermediate entities in the network, e.g., routers, for various functions. The source IP address is checked to make sure that it is the same as the entry burned into the SDB 412 for the connected host. This prevents an adversary from posing as the connected host to gain access to secure communications. This is called preventing "IP spoofing" and is described in detail in U.S. patent application Ser. No. 08/529,497. The discussion of preventing IP spoofing is incorporated herein by reference.

If the destination to which the packet is addressed is insecure, the packet is dropped (step 906, 908). The device may be in a secured/unsecured mode (special order). In such case the packet will be sent unchanged.

Next, it is determined if the packet contains a part of a message that has been fragmented (step 910). If the packet contains a fragment, the fragments are collected (step 912) and the message is encrypted (step 914). The encryption takes place using the common session key and an encipherment function. If the encrypted message is too long for the particular LAN (step 916), it is fragmented (step 918). An encrypted packet is then transmitted to interface 408 for transmission into the network 100 (step 920).

An encrypted packet carries a signature in the protocol part of the IP header. This indicates that the packet is encrypted. The IP address of a packet is not encrypted, otherwise the packet could not be routed through the network.

The case where the packet arrives via the network at interface 408 is now considered. If the packet is an ICMP or IGMP packet (step 940) no decryption is necessary and the packet is sent to the first interface 402 (step 942). If the packet is a key exchange packet (step 944) the packet is processed according to the key exchange protocol (step 946). If the packet is not encrypted (step 948) the packet is dropped (step 950). The device may be in a secured/unsecured mode (special order). In such a case the packet will be sent to the client unchanged. If the packet is encrypted but the network security device does not have the key (step 952), the key exchange protocol is carried out (step 954) and the packet is dropped (step 956). If the key is available in the dynamic data base of the network security device, the packet is decrypted (step 958) and sent to interface 402 (step 960).

For packets received from the network the MAC address of the network security device is translated into the MAC address of the client. For packets received from the protected client, the MAC address of the client is translated into the MAC address of the network security device.

Outgoing Packets

As discussed above, the network security device 100 receives an IP-packet on the first interface 402, processes it, and sends it onto network 100 via the second interface 408.

Figure 10:
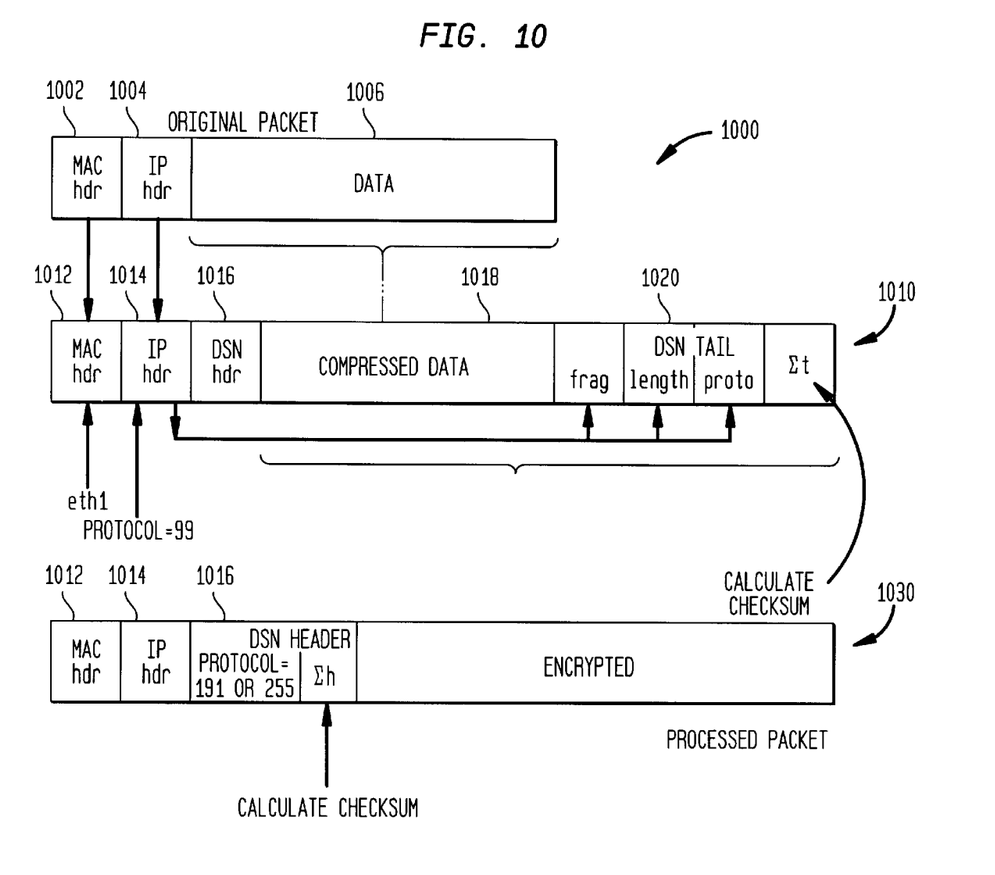
FIG. 10 illustrates an IP packet received from a connected host by the network security device and an IP packet transmitted from the network security device into a network.

FIG. 10 illustrates an IP packet 1010 ($IP_{in}$) received from host 404, an IP packet ($IP_{out}$) 1010 prepared by the network security device 400, and an encrypted $IP_{out}$ packet 1030 transmitted by the second interface 408. As seen in FIG. 10, the $IP_{in}$ packet 1000 includes a MAC header 1002, containing the host's 404 MAC address, an IP header 1004, containing the host's IP address, and a payload 1006 containing data. The $IP_{out}$ packet 1010 includes a MAC header 1012 containing the network security device's MAC address, an IP header 1014 containing the host's 404 IP address, a proprietary header 1016, a payload 1118 containing the data, and a proprietary tail 1020. Preferably, the data in the payload 1118 is compressed and the proprietary tail 1120 includes packet length, protocol fragment, and checksum information. The encrypted $IP_{out}$ packet 1030 preferably has everything after the proprietary header 1016 encrypted, including the compressed data 1018 and the proprietary tail 1020.

Figure 11:
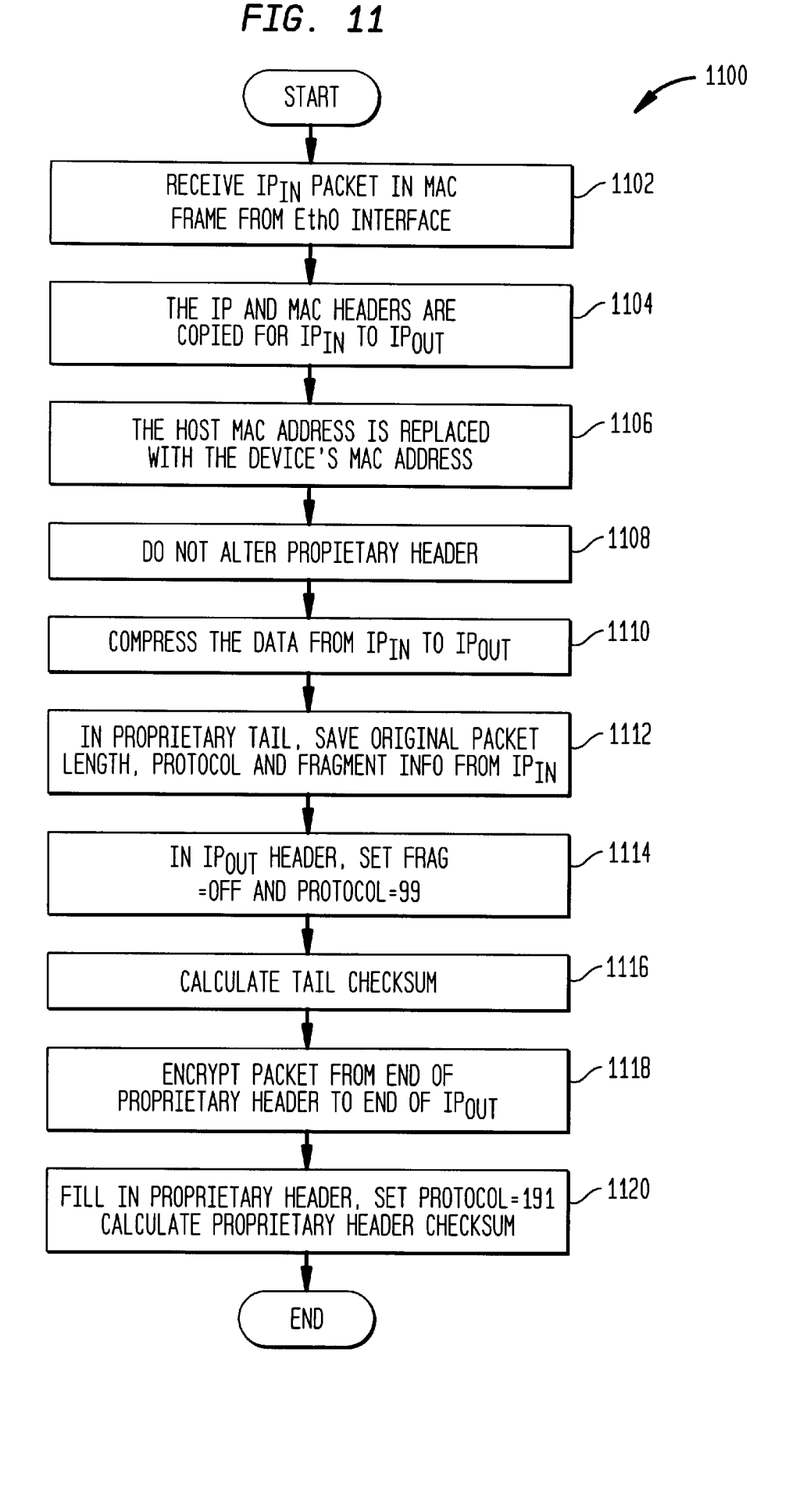
FIG. 11 is a flowchart illustrating a method of processing the packets of FIG. 10.

FIG. 11 is a flowchart 1100 illustrating the processing of $IP_{in}$ and $IP_{out}$.

(a) Packet $IP_{in}$ 1000 is received from the host 404 at the first interface 402 (step 1102).

(b) The IP and MAC headers are copied from $IP_{in}$ to $IP_{out}$ (step 1104).

(c) The destination MAC address in $IP_{in}$ is replaced by the client's MAC-address (step 1106).

(d) Skip over the proprietary-header (step 1108).

(e) Compress the data from $IP_{in}$ to $IP_{out}$ (step 1110). Preferably, the data is compressed using the LZRW1 compression algorithm.

(f) Save original length, protocol, frag-info from $IP_{in}$ into the proprietary tail (step 1112).

(g) In the $IP_{out}$ header, set do not frag=off, and set $IP_{out}$-protocol=99 (indicating proprietary protocol) (step 1114).

(h) Calculate the checksum and save it in the proprietary tail 1120 (step 1116).

(i) Encrypt everything from after the proprietary header until the end of $IP_{out}$ (step 1118).

(j) Fill the proprietary-header in $IP_{out}$; set protocol=191 (encrypted packet) and calculate the header-checksum (step 1120).

Incoming Packets

For incoming packets, steps (b)–(j) are performed in reverse order.

Double Integrity Checks

The method illustrated in FIG. 11 provides a double integrity check. The checksum in the proprietary-header on the sender's side is calculated after the encryption and checked on the receiver's side before decryption, thus providing an integrity test of the encrypted data in transit.

The checksum in the proprietary-tail on the sender's side is calculated before encryption and checked on the receiver's side after decryption. This checksum provides strong authentication because the static and dynamic keys used to encrypt the checksum are known only by the two communicating devices. (Strong authentication is where one can prove it knows a secret without revealing the secret.) By using a decrypted checksum that agrees with the packet proves the sender and receiver share the same key.

If the encrypted tail checksum is replaced with a secure hash function, such as the well-known MD5 algorithm, after the packet is encrypted, it becomes a digital signature. Where the tail checksum is encrypted with a static common key, it verifies that the dynamic public key originated from the sender, thus authenticating the sender. When the tail checksum is encrypted with a dynamic common key, it also verifies that the packet originated from the sender, authenticating that the packet originated from the sender.

Modifications for Use With LANS

Referring again to FIG. 4B, the network security device 400' may be modified to protect a LAN 450 instead of a single host. These modifications are described below. In this illustrative embodiment, the network security device may protect a Class-C LAN having up to 254 clients (i.e., workstations 454, server 452, etc.), but other LAN types, such as Class-A and Class-B, are also contemplated by the invention.

During activation, the IP address burned into the flash memory 412 is the Class-C post of the client LAN's IP address. A default MAC address, such as Oxf may also be burned into the flash memory 412. This default MAC address is used in the static key generation. Recall that the MAC address is used in the static key seed generation.

A LAN-type network security device 400' may build a MAC-table 460 which contains its client's IP and MAC addresses. This table serves two functions. First, it prevents IP spoofing of any of the LAN device's 400' clients. Thus, if a packet is received on the first interface 402 that does not have an IP or MAC address of one of the nodes in the LAN, that packet is dropped.

Second, it facilitates the delivery of packets to clients connected to the LAN 450. This permits packets to be sent from one protected client to another without the packet appearing at the second interface 408.

In short, a unique network security device has been disclosed. Finally, the above described embodiments of the invention are intended to be illustrative only. Numerous alternative embodiments may be devised by those skilled in the art without departing from the scope of the following claims.

What is claimed is:

1. A method for generating a secret key for a network security device configured to protect at least one host, the secret key being unique to that network security device, the method comprising the steps of:

a. deriving a seed based on at least one of an Internet protocol (IP) and physical layer address of the at least one host; and b. generating a random number based on the seed.

2. The method of claim 1, wherein the step of deriving the seed further comprises deriving the seed according to:

$$seed = IP + MAC_l + MAC_h + serial + time$$

where:

IP=an IP address for the host;

$MAC_l$ is a least significant portion of a physical layer address of the host;

$MAC_h$ is a most significant portion of host's physical layer address; serial is a serial number of the network security device; and time is a time the seed is derived.

3. The method of claim 1, wherein the step of generating a random number further comprises supplying the seed to a random number generator and using an output of the random number generator as the secret key.

* * * * *